(12) United States Patent
Yoshizuru et al.

(10) Patent No.: US 6,210,615 B1
(45) Date of Patent: Apr. 3, 2001

(54) METHOD OF FORMING A ROOF MOLDING WITH A MOUNTING AND FIXING PROTECTION PORTION FORMED ON A LEG PORTION OF THE ROOF MOLDING

(75) Inventors: Fumitaka Yoshizuru; Hideharu Fujimatsu; Hideo Fukui, all of Aichi (JP)

(73) Assignee: Inoac Corporation, Aichi (JP)

(*) Notice: Subject to any disclaimer, the term of this patent is extended or adjusted under 35 U.S.C. 154(b) by 0 days.

(21) Appl. No.: 09/218,450

(22) Filed: Dec. 22, 1998

(30) Foreign Application Priority Data

Apr. 22, 1998 (JP) .................................................. 10-112310

(51) Int. Cl.[7] ........................... B29C 43/14; B29C 43/04; B29C 43/42; B29C 43/52; B29C 43/38
(52) U.S. Cl. ........................ 264/138; 264/148; 264/149; 264/171.14; 264/296; 264/322; 425/297; 425/356; 425/394; 425/398; 425/401
(58) Field of Search ................................ 264/138, 210.1, 264/210.2, 149, 148, 171.14, 296, 320, 322; 425/356, 297, 383, 394, 398, 401

(56) References Cited

U.S. PATENT DOCUMENTS

| 5,013,083 | * | 5/1991 | Yada et al. | 296/216 |
| 5,085,902 | * | 2/1992 | Yada et al. | 428/31 |
| 5,108,681 | * | 4/1992 | Cakmakci | 264/151 |
| 5,227,108 | * | 7/1993 | Reid, Jr. et al. | 264/148 |
| 5,419,863 | * | 5/1995 | Henderson | 264/148 |
| 5,605,658 | * | 2/1997 | Remington | 264/320 |
| 5,709,912 | * | 1/1998 | Goto et al. | 428/31 |

FOREIGN PATENT DOCUMENTS

| 2-267040 | 10/1990 | (JP) | B60R/13/04 |
| 2812766 | 8/1998 | (JP) | B60R/13/04 |

* cited by examiner

Primary Examiner—Jan H. Silbaugh
Assistant Examiner—Michael I. Poe
(74) Attorney, Agent, or Firm—Sughrue, Mion, Zinn, Macpeak & Seas, PLLC

(57) ABSTRACT

In a method for working the end portion of a roof molding for use in an automobile, at desired position on the molding surface 32 of a pressing mold 31 that faces a cut-away portion 21 formed on the back surface of the end portion 12 of the roof molding, there is formed a pressing projecting portion 33 which extends along the width direction of the end portion 12. In a pressing operation after the end portion 12 is heated and softened, the cut-away portion 21 of the back surface of the end portion 12 is pressed and deformed by the pressing projecting portion 33 of the pressing mold 31 to thereby form a mounting and fixing projection portion 22 which projects toward at least one side in the width direction of the end portion 12.

8 Claims, 13 Drawing Sheets

METHOD OF FORMING A ROOF MOLDING WITH A MOUNTING AND FIXING PROTECTION PORTION FORMED ON A LEG PORTION OF THE ROOF MOLDING

BACKGROUND OF THE INVENTION

1. Field of the Invention

The present invention relates to a method for working the end portion of a roof molding for use in an automobile.

2. Description of the Related Prior Art

As shown in FIG. 16, in many cases, a roof molding 60 is mounted on the roof 51 of an automobile 50. As can be seen from FIG. 17 which shows part of the roof 51 with the roof molding 60 removed from the automobile 50, in order to conceal the connecting lines of the portions of a roof panel 52 and an outer panel 53 where they are connected integrally with each other, the roof molding 60 is mounted or fitted into a groove 54 which is formed in the connecting portions of the two roof and outer panels 52 and 53.

The roof molding 60, as can be seen from FIG. 18, is composed of a leg portion 61 and a decorative portion 65 which is disposed on the upper end of the leg portion 61, while the decorative portion 65 is used as the design surface of the roof molding 60; and, the roof molding 60 is mounted in such a manner that the leg portion 61 thereof is inserted into the groove 54 and the decorative portion 65 thereof covers the groove 54. Also, in many cases, a metal core member 63 is embedded into the leg portion 61 in such a manner as to extend along the longitudinal direction thereof in order not only to mount and hold the roof molding 60 in the groove 54 of the above panel connecting portions correctly but also to reduce the linear expansion of the leg portion 61. In FIG. 18, reference character 66 designates a lip (a fin piece) which is formed on the two side surfaces of the lower portion of the leg portion 61 in such a manner as to extend along the longitudinal direction thereof, in order to assure the fixing of the leg portion 61 to the grooves 54.

By the way, if the two end portions of the groove 54 of the connecting portion of the roof 51 are molded by pressing with the same depth as the central portion of the groove 54, then there is caused a crack in the upper corner portions 55 of the groove 54. For this reason, the groove 54 is formed in such a manner that it becomes gradually smaller in depth toward the ends thereof. Accordingly, if, as the roof molding 60, there is used a molding which can be obtained simply by cutting a molding blank member 60a consisting of a long extruded molding into a given length, then the lower end of the leg portion 61 interferes with the body of the automobile, which makes it impossible to mount the roof molding 60 into the groove 54 correctly. Therefore, recently, there has been proposed a method in which, as shown in FIG. 18, an end portion 62 matched to the depth of the end portion of the groove 54 is injection molded in the end portion of the molding blank member 60a cut to a given length.

However, in the roof molding 60 with the injection molded end portion 62, on the surface of the end portion of the roof molding 60, in particular, between the molding blank member 60a and end portion 62, there is produced a joint line 67 which can impair the appearance of the roof molding 60. Also, because the main body portion of the roof molding 60 composed of the molding blank member 60a is different in the resin shrinkage ratio from the injection molded end portion 62, there is caused a crack in the portion of the joint line 67 due to the difference between the thermal shrinkage amounts between them or due to the degradation thereof; and, in the worst case, the end portion 62 and molding blank member 60a can be separated from each other.

Also, partly because the groove 54 of the roof 51 is mostly curved in the neighborhood of the end portions thereof in the plane direction thereof as well as in the height direction thereof, and partly because such lip 66 or the like as in the molding blank member 60a is not present in the injection molded end portion, the end portion 62 as it is cannot be fixed along the groove 54 fitly, but there can be produced a gap between the one side portion of the end portion 62 and the side surface of the groove 54, or the end portion 62 can be warped from the groove 54. To solve these problems, conventionally, the end portion 62 is fixed to the end portion of the groove 54 with pressure sensitive adhesive double coated tape or adhesive agents. However, it takes time and labor to carry out such assemblies, which increases the cost thereof; and also, the adhesive strength of the adhesive tape or adhesive agents can be rather weak, so that, as time passes, the end portion 62 becomes easy to warp from the groove 54.

By the way, to make the end portion 62 to follow the above-mentioned curved shape of the end portion of the groove 54, there can be imagined a method in which, when the end portion 62 is injection molded, a projection is formed on the side surface of the end portion 62 to thereby make constant the distance between the side surface of the groove 54 end portion and the side surface of the end portion 62, or a method in which a clip is provided in the end portion of the groove 54 and there is formed in the end portion 62 a portion to be engageable with a pawl formed in the present clip. In these cases, however, the strength of the connecting portions between the end portion 62 and molding blank member 60a is weak and, therefore, if the end portion 62 is mounted into the groove 54 of the roof 51 in such a manner that the end portion 62 is curved, then there is a danger that the end portion 62 can be separated in the joint line 67. Also, to avoid this problem, there can be imagined another method in which only the projection is injection molded locally in the molding blank member 60a cut to a given shape. Even in this case, however, the adhesive strength between the projection and molding blank member 60a is weak and, therefore, there is a danger that the end portion 62 can be peeled or slipped off at such projection portion from the molding blank member 60a.

SUMMARY OF THE INVENTION

The present invention aims at eliminating the above drawbacks found in the conventional methods. Accordingly, it is an object of the invention to provide a method for working the end portion of a roof molding for use in an automobile, which not only eliminates a joint line in the design surface of the end portion of the roof molding to thereby be able to provide a beautiful appearance and high durability but also allows the end portion of the roof molding to be fixed to a groove formed in the roof of an automobile accurately and positively.

In attaining the above object, according to a first aspect of the invention, there is provided a method for working the end portion of a roof molding in which the back surface side of the end portion of a molding blank member formed of resin and having a given cross section shape is cut away to thereby reduce the thickness of the leading end side of said end portion, the end portion of the molding blank member is heated and softened, and, after then, while the design surface of the roof molding end portion is being received by a receiver mold, the back surface of the present end portion is pressed by a pressing mold, characterized in that, at a desired position on the molding surface of the pressing mold that faces a cut-away portion formed on the back surface of the present end portion, there is formed a pressing projecting portion which extends along the width direction of the present end portion, and, in the above pressing operation, the cut-away portion of the back surface of the present end portion is pressed and deformed by the pressing projecting portion of the pressing mold to thereby form a mounting and fixing projection portion which projects toward at least one side in the width direction of the present end portion.

Also, according to a second aspect of the invention, there is provided a method for working the end portion of a roof molding in which the back surface side of the end portion of a molding blank member formed of resin and having a given cross section shape is cut away to thereby reduce the thickness of the leading end side of the present end portion, the end portion of the molding blank member is heated and softened, and, after then, while the design surface of the present end portion is being received by a receiver mold, the back surface of the present end portion is press worked by a pressing mold, characterized in that a bulged portion has been previously formed on the above-mentioned cut-away portion of the back surface of the present end portion, and, in the above pressing operation, the bulged portion of the cut-away portion is pressed to flow the resin of the present bulged portion into one side in the width direction of the present end portion, thereby forming a mounting and fixing projection portion which projects toward at least one side in the present end portion width direction.

Further, according to a third aspect of the invention, there is provided a method for trimming the end portion of a roof molding, wherein the mounting and fixing projection portion has a gap with respect to the back side of the above-mentioned design surface.

Still further, according to a fourth aspect of the invention, there is provided a method for working the end portion of a roof molding, wherein the back surface side of the end portion of a molding blank member formed of resin and having a given cross section shape is cut away to thereby reduce the thickness of the leading end side of the present end portion, the end portion of the molding blank member is heated and softened, and, after then, the side surface of the present end portion is pressed and deformed by a pressing mold to thereby form a mounting and fixing recessed portion on the present end portion side surface.

DETAILED DESCRIPTION OF THE PREFERRED EMBODIMENTS

Now, a description will be given below in detail of a roof molding for use in an automobile according to the invention with reference to the accompanying drawings.

At first, a description will be given of an embodiment of a roof molding for use in an automobile obtained by a method for working the end portion of a roof molding according to a first aspect of the invention, and a description will be given of an embodiment of the method for working the end portion of a roof molding according to the first aspect of the invention.

Figure 1:
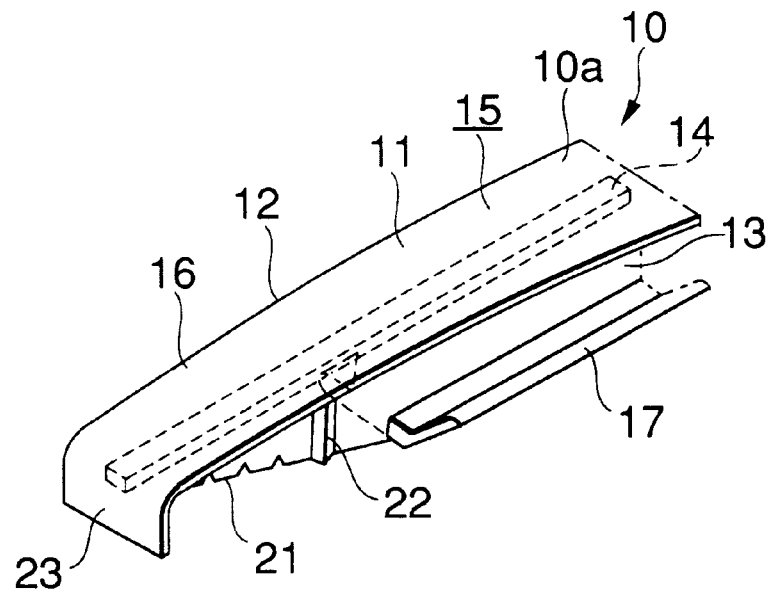
FIG. 1 is a perspective view of the main portions of a roof molding for use in an automobile obtained according to a first embodiment of the invention.
Figure 2:
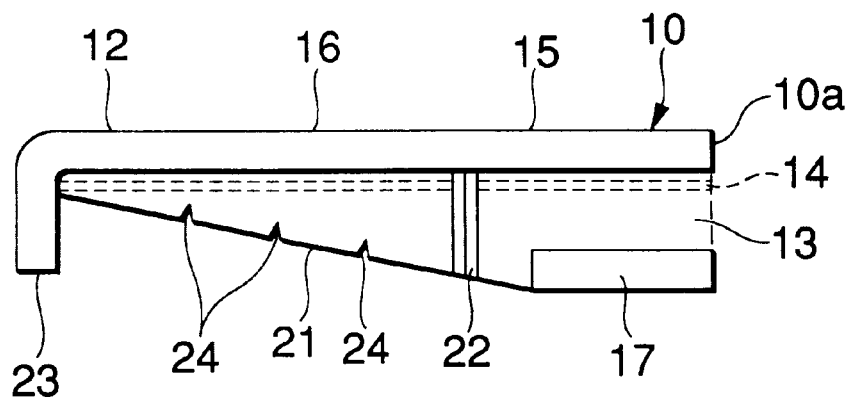
FIG. 2 is a side view of the above roof molding main portions.
Figure 3A:
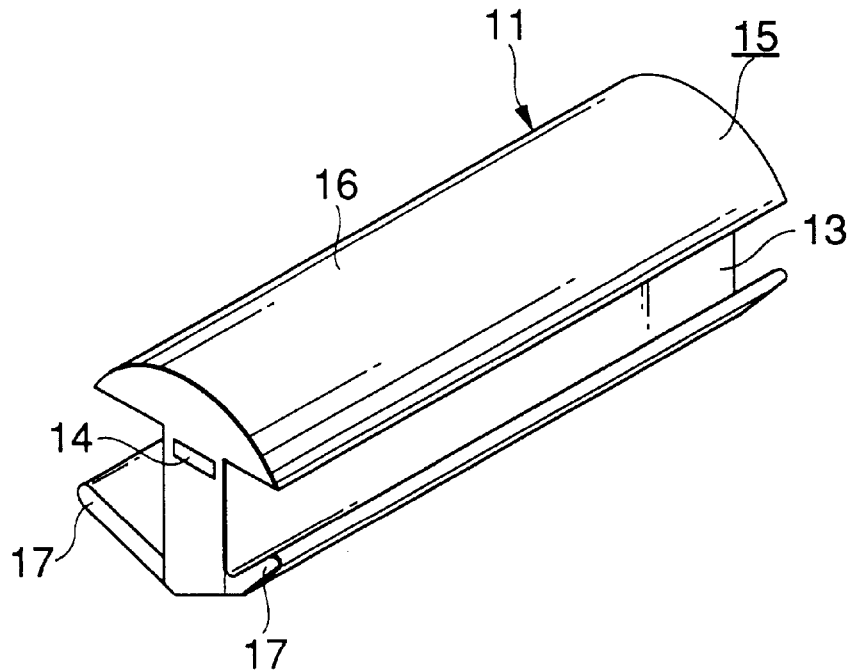
FIGS. 3A and 3B are perspective views of the roof molding main portions, showing the stages of a cutting step included in a working operation to work the end portion of a roof molding for use in an automobile.
Figure 3B:
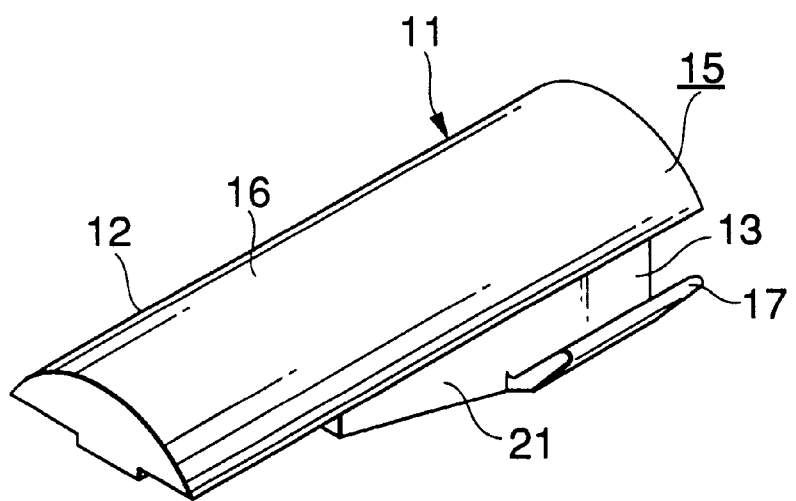
Figure 16:
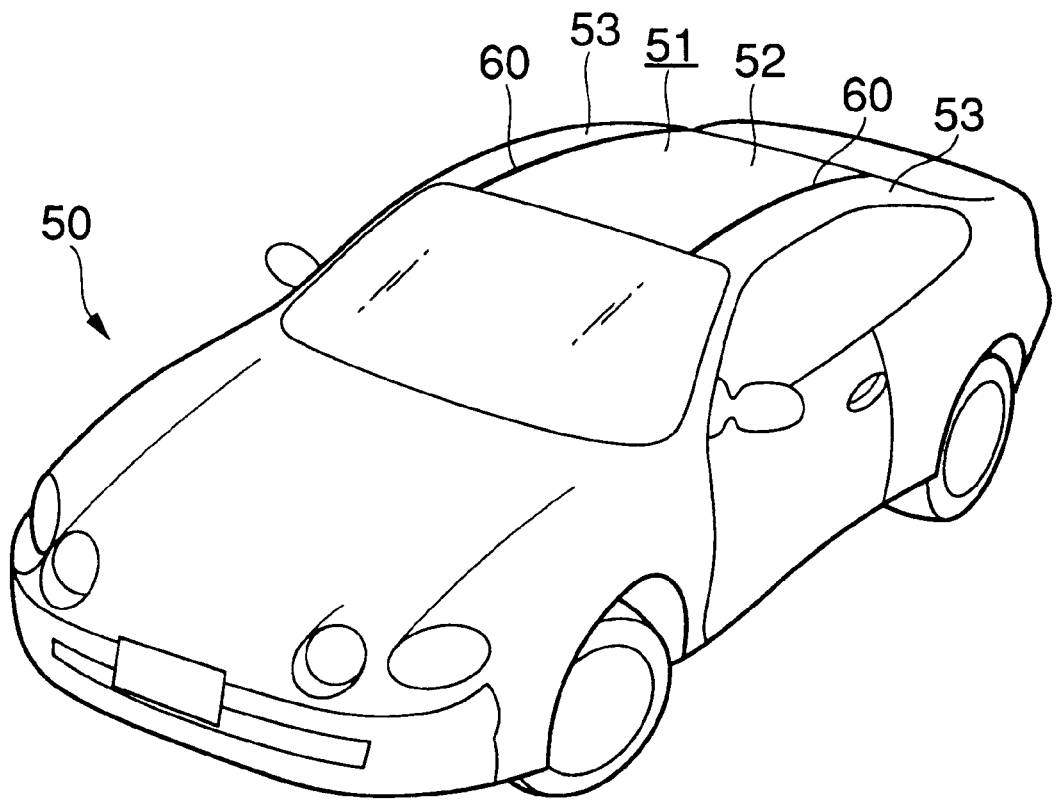
FIG. 16 is a perspective view of an example of an automobile on which a roof molding is mounted.
Figure 17:
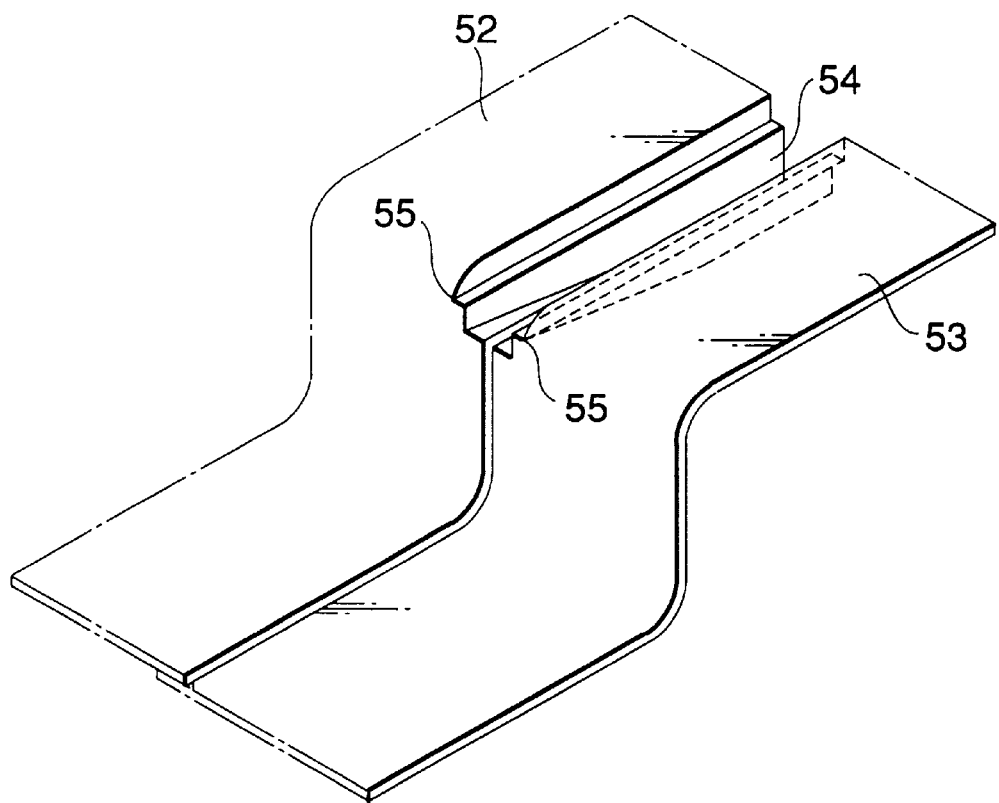
FIG. 17 is a perspective view of a portion of the roof of the automobile, showing a state thereof in which a roof molding is removed therefrom.
Figure 18:
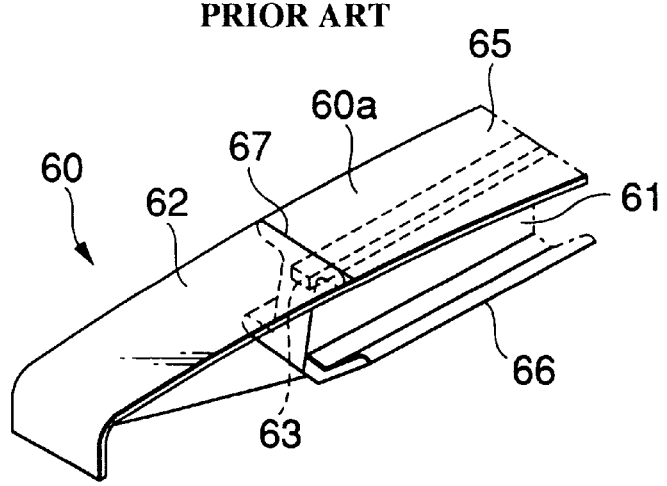
FIG. 18 is a perspective view of the end portion of a conventional roof molding.

A roof molding 10 for use in an automobile shown in FIGS. 1 and 2 comprises a leg portion 13 with a metal core member 14 embedded therein and a decorative portion 15 formed on the upper end of the leg portion integrally therewith; the roof molding 10 is formed of a resin molding blank member 11 which is an extruded molding shown in FIG. 3A and having a given cross section shape and also the end portion of which is worked according to a first aspect of the invention; and in the roof molding 10, a main body portion 10a thereof, which is to be mounted in the bottom of the groove 54 of the roof 51 shown in FIG. 16, is formed in such a manner as to continue with an end portion 12 thereof to be mounted in the shallow end portion of the groove 54, that is, no joint line is present between them.

The decorative portion 15 includes an outer surface which forms a design surface 16 of the roof molding 10. In particular, the design surface 16 has such a width as to be able to cover the groove 54 and extends from the upper end of the leg portion 13 toward both sides in the width direction thereof. And, the leading end 23 of the end portion 12 is formed in such a manner as to be bent downward.

On the other hand, referring to the function of the leg portion 13, if the leg portion 13 is inserted into the groove 54 of the roof 51, then the roof molding 10 can be fitted or mounted into the groove 54. For this purpose, on the two sides of the leg portion 13, in more particular, integrally therewith, there are provided lips 17 formed of soft resin in order that, when the leg portion 13 is inserted into the groove 54, the lips 17 are pressed and contacted with the side walls of the groove 54 to thereby be able to hold the roof molding 10 stably. The bottom area of the leg portion 13 is cut away obliquely toward the rear side of the design surface 16 in order that the end portion 12 of the roof molding 10 can be made to become thinner in thickness along the main body portion 10a toward the leading end 23 of the end portion 12; and also, the leg portion 13 is cut away in the lips 17 portions thereof as well. Here, reference character 21 stands for a cut-away portion of the leg portion 13 which is formed by the above-mentioned cutting operation, while the cut-away portion 21 is formed in such a manner as to have a depth corresponding to the depth of the end portion of the groove 54 of the roof 51. In the present embodiment, in the neighborhood of the leading end 23 of the end portion 12, the leg portion 13 is completely cut away together with the metal core member 14.

On the side surface of the cut-away portion 21 of the leg portion 13, there is formed a rib-shaped, mounting and fixing projection portion 22 which projects in the width direction of the roof molding 10 and extends along the height direction of the roof molding 10. The present mounting and fixing projection portion 22 substitutes for the lips 17 in the cut-away portion 21 of the leg portion 13 where the lips 17 are cut away; that is, when the end portion 12 is mounted in the end portion of the groove 54 of the roof 51, the mounting and fixing projection portion 22 is pressure contacted with the side walls of the groove 54 to thereby fix the end portion 12 at a correct position within the end portion of the groove 54 so as to prevent the end portion 12 from warping from the groove 54 or from clustering on either side of the groove 54. In the present embodiment, there are employed two mounting and fixing projection portions 22 each on either of the two side surfaces of the cut-away portion 21. However, this is not limitative but the number and position of the mounting and fixing projection portions 22 can be designed properly, especially, the position thereof may be effectively set as near as possible to the leading end 23 of the end portion 12. Also, on the lower surface of the cut-away portion 21, there are formed a plurality of bent grooves 24 which respectively extend in the width direction of the cut-away portion 21 and are spaced at given intervals from one another. The bent grooves 24 are used to make the end portion 12 easy to curve along with the curvature of the bottom surface of the groove 54 when the end portion 12 is mounted into the groove 54 of the roof 51.

Next, description will be given below of an embodiment of a method for working the end portion of the above-mentioned roof molding 10. At first, the resin molding blank member 11 consisting of an extruded molding having a given cross section shape shown in FIG. 3A, that is, the resin molding blank member 11 including the above-mentioned decorative portion 15 and leg portion 13 is cut to a given length. The surface of the decorative portion 15 constitutes the design surface 16; and, on the other hand, in the leg portion 13, there is embedded the metal core member 14, while in the bottom portion of the leg portion 13 there are formed the lips 17.

Then, the above molding blank member 11 of a given length is worked: that is, while the decorative portion 15 is left unchanged on the back surface side of the end portion 12 of the molding blank member 11, the leg portion 13 is cut away in part over a given length from the leading end of the end portion 12. This cutting of the leg portion 13 is executed in the range that corresponds to the shallow portion of the end portion of the groove 54 of the roof 51, and the leg portion 13 is cut away in such a manner that the lower end of the cut-away portion 21 thereof is inclined toward the back surface of the design surface 16 so that the molding blank member 11 can become thinner in thickness from the main body portion 10a of the molding blank member 11 toward the leading end 23 of the end portion thereof. Further, in the present embodiment, in the neighboring portions of the leading end 23 of the end portion 23, the leg portion 13 is cut away completely together with the metal core member 14. By the way, such cutting operation is executed according to a known cutting method using a cutter, a press, or the like.

Figure 4:
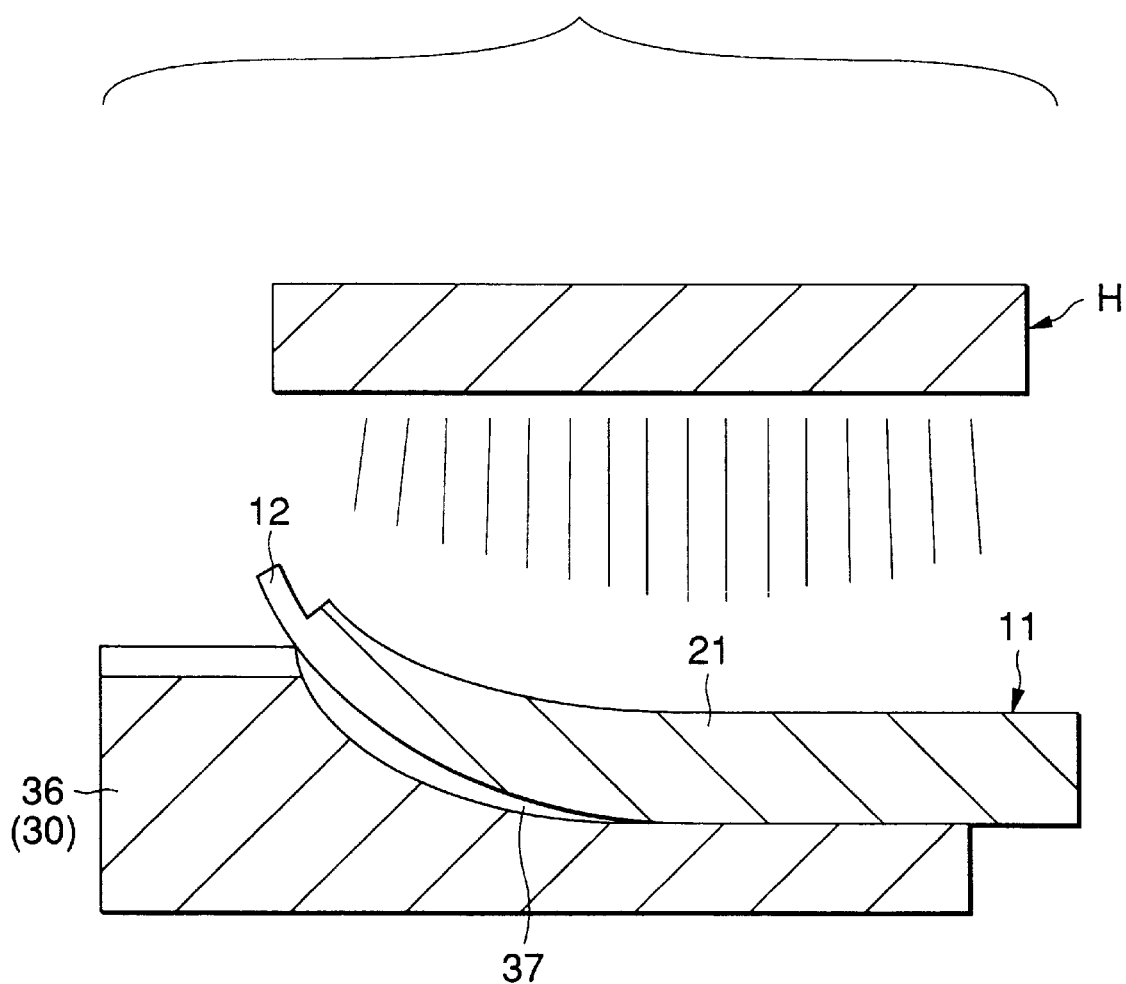
FIG. 4 is a section view of the roof molding main portions, showing a heating and softening step in the above-mentioned end portion working operation.

Next, as shown in FIG. 4, the end portion 12 of the molding blank member 11 is set in a receiver mold 36 which forms part of a press molding mold 30 and, after then, the cut-away portion 21 of the end portion 12 is heated and softened by heating means H such as a heater or the like. In the receiver mold 36, there is formed a cavity surface 37 which has a desired roof molding end portion shape. The degree of the above heating is set in the degree that can soften the end portion 12, while the temperature of the heating is set in a proper temperature according to the material of the molding blank member 11.

Figure 5:
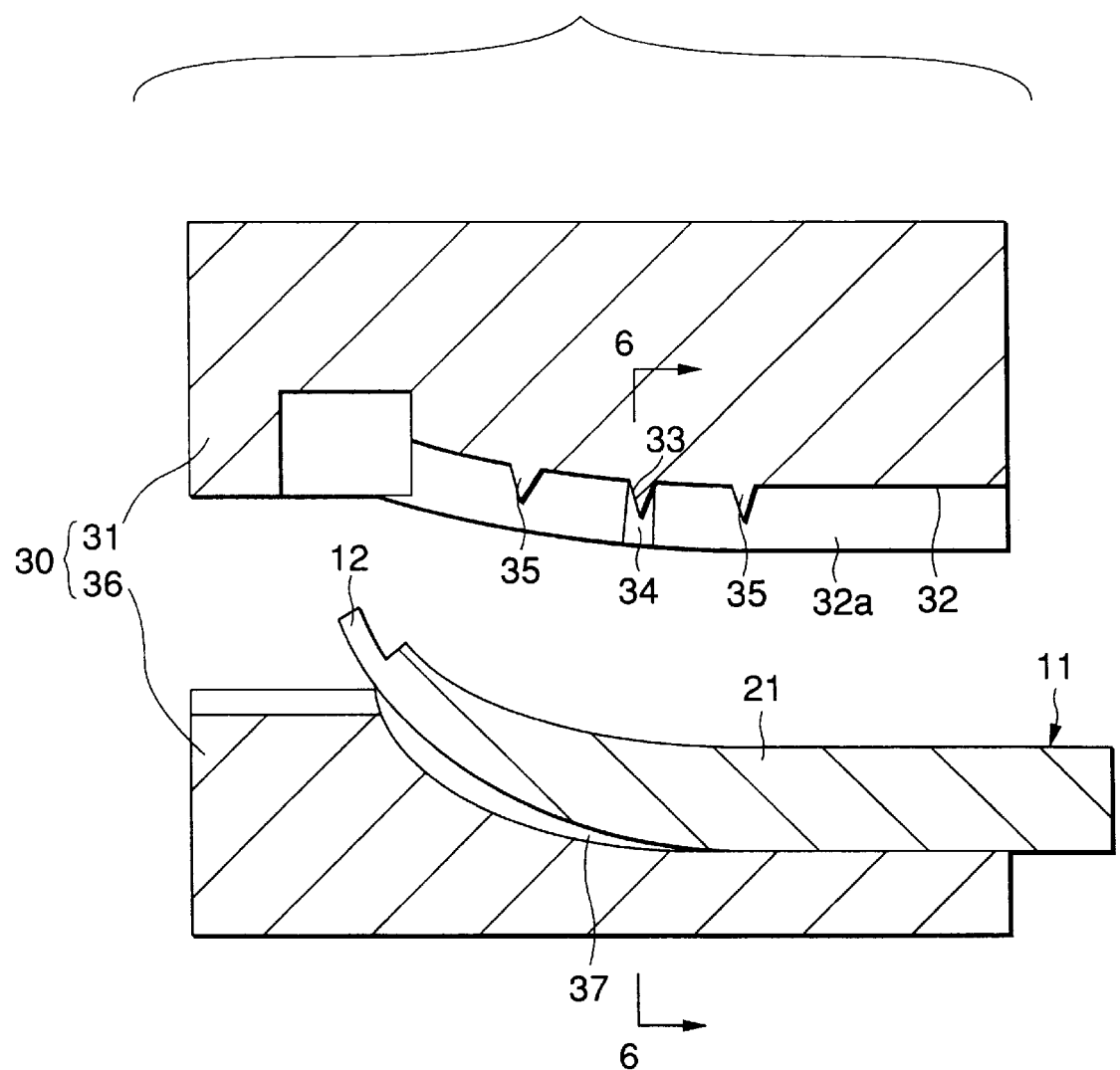
FIG. 5 is a section view of the roof molding main portions, showing a pressing step in the end portion working operation.
Figure 6:
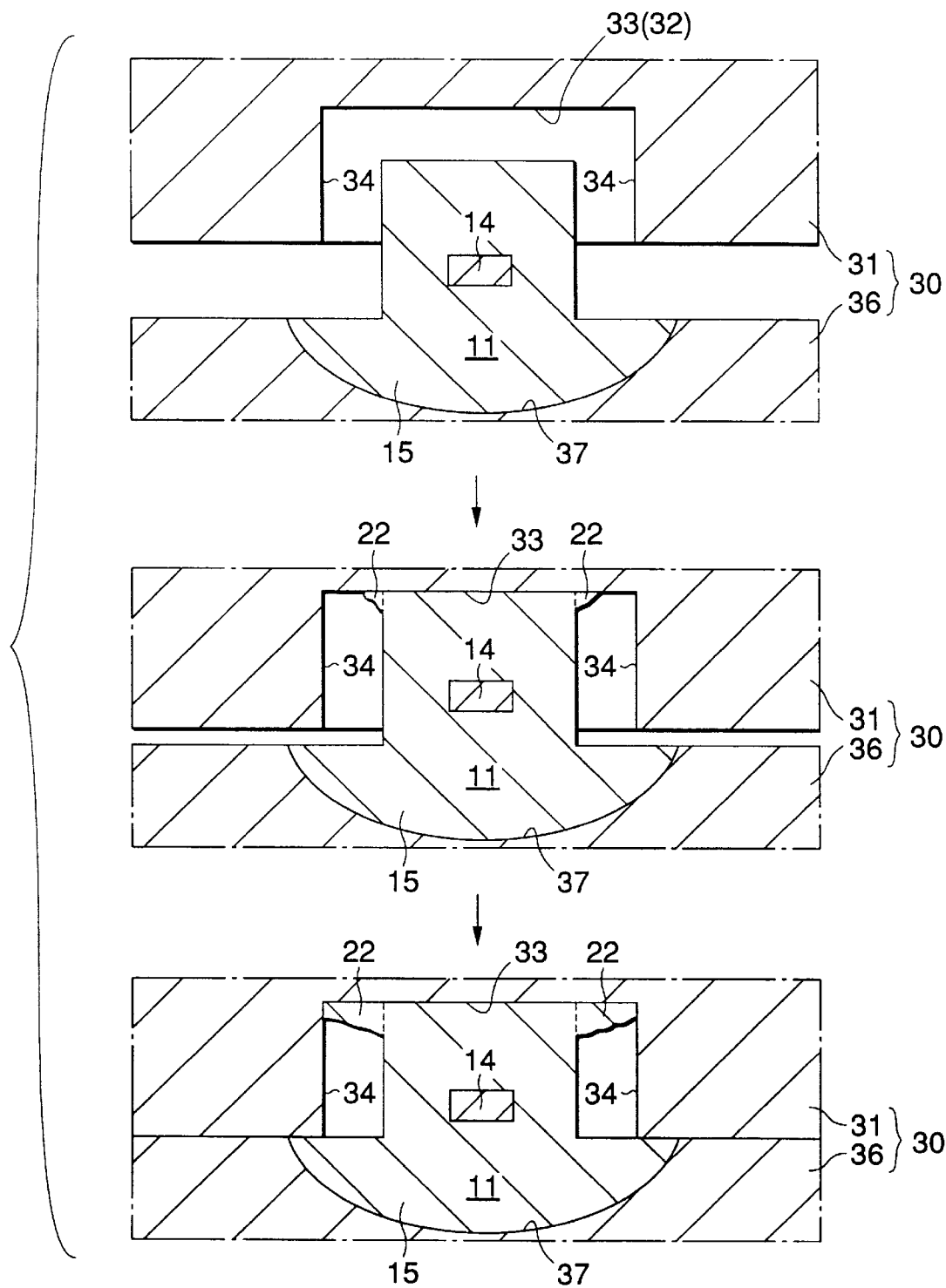
FIG. 6 is section views respectively taken along the line 6—6 shown in FIG. 5, showing the stages of the pressing step.
Figure 7:
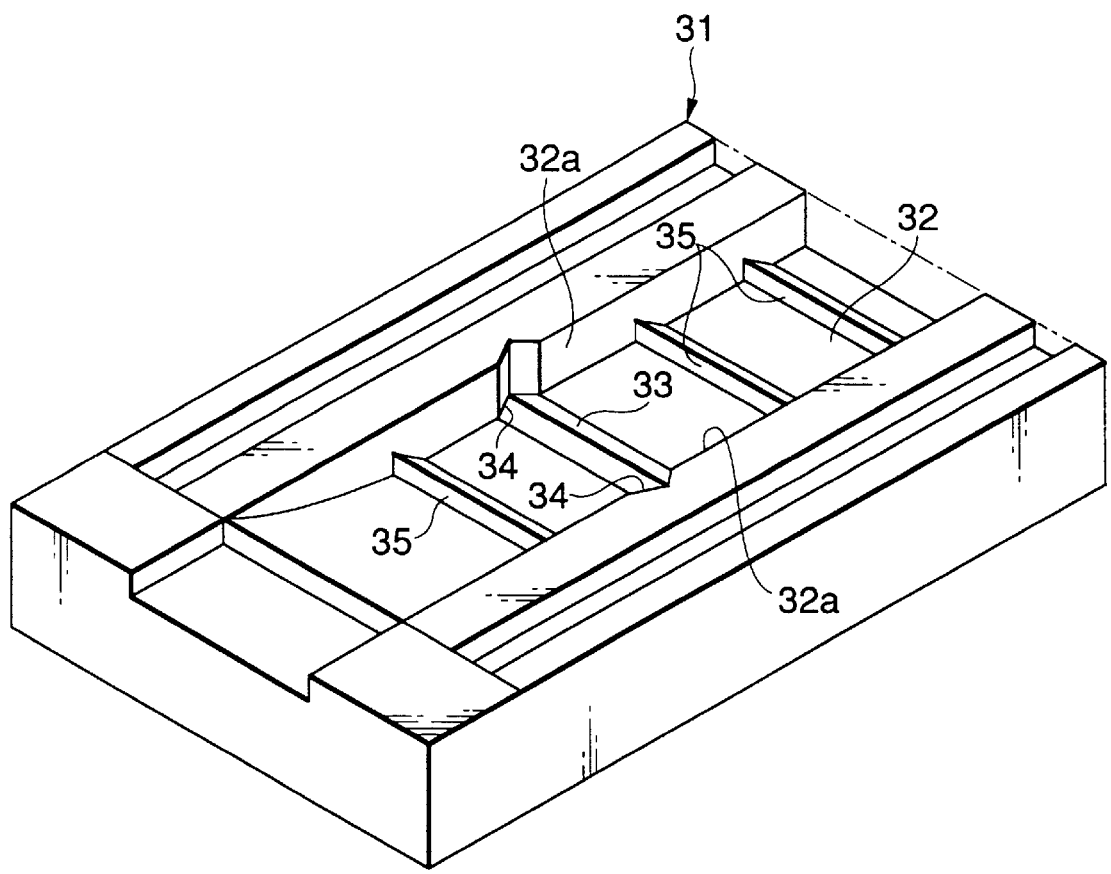
FIG. 7 is a perspective view of an example of a pressing mold used in the pressing step.

After completion of the heating and softening treatment of the end portion 12, as shown in FIGS. 5 and 6, the cut-away portion 21 of the end portion 12 is pressed by a pressing mold 31 of the press molding mold 30 to thereby form the same into a desired end portion shape. The molding surface 32 of the pressing mold 31, in the present embodiment, as shown in FIG. 7, is depressed in a concave shape; in the portion thereof where the surface (lower end) of the back surface cut-away portion 21 of the end portion 12 is positioned, there is formed a pressing projecting portion 33 in such a manner that it extends along the width direction of the end portion 12 of the molding blank member 11; and, in the side surfaces 32a of the molding surface 32 that respectively continue with the two ends of the pressing projecting portion 33, there is formed a projection-forming recessed groove 34 in such a manner that it extends in the vertical direction of the molding surface 32. These pressing projecting portion 33 and projection-forming recessed groove 34 are used to form the mounting and fixing projection portion 22 in the molding end portion 12 shown in FIGS. 1 and 2. That is, in the above-mentioned pressing operation, the surface of the softened cut-away portion 21 is pressed by the pressing projecting portion 33, so that the thus pressed resin of the cut-away portion 21 is guided to the projection-forming recessed groove 34 continuing with the two ends of the pressing projecting portion 33 and is hardened to thereby form the mounting and fixing projection portion 22 on the side surface of the cut-away portion 21.

Further, in the present embodiment, on the molding surface 32 of the pressing mold 31, there is formed a bent-groove pressing projecting portion 35 which extends along the width direction of the molding blank member 11 and is used to form the bent groove 24 of the roof molding 10; in particular, the bent groove 24 is formed in the above-mentioned pressing operation. Also, the extra resin of the end portion 12 is formed in the edges of the end portion 12 as flashes, which can be removed finally. After then, if the press molding mold 30 is opened and a resultant molding is taken out therefrom, then there can be obtained the desired end portion 12 of the roof molding 10 shown in FIGS. 1 and 2. By the way, in the above embodiment, the press molding mold 30 is structured such that the molding surface 32 of the pressing mold 31 and the cavity surface 37 of the receiver mold 36 are both inclined. However, this is not limitative but, alternatively, the molding surface (or cavity surface) of one of them can be formed in such a manner as to be substantially horizontal, whereas the cavity surface (or molding surface) of the other can be inclined in such a manner as to correspond to one of them.

Figure 8:
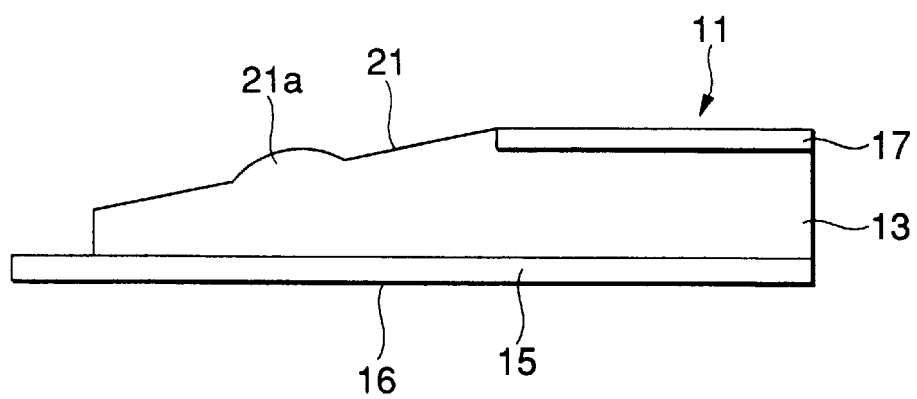
FIG. 8 is a side view of the end portion of a molding blank member after cut according to a second aspect of the invention.
Figure 9A:
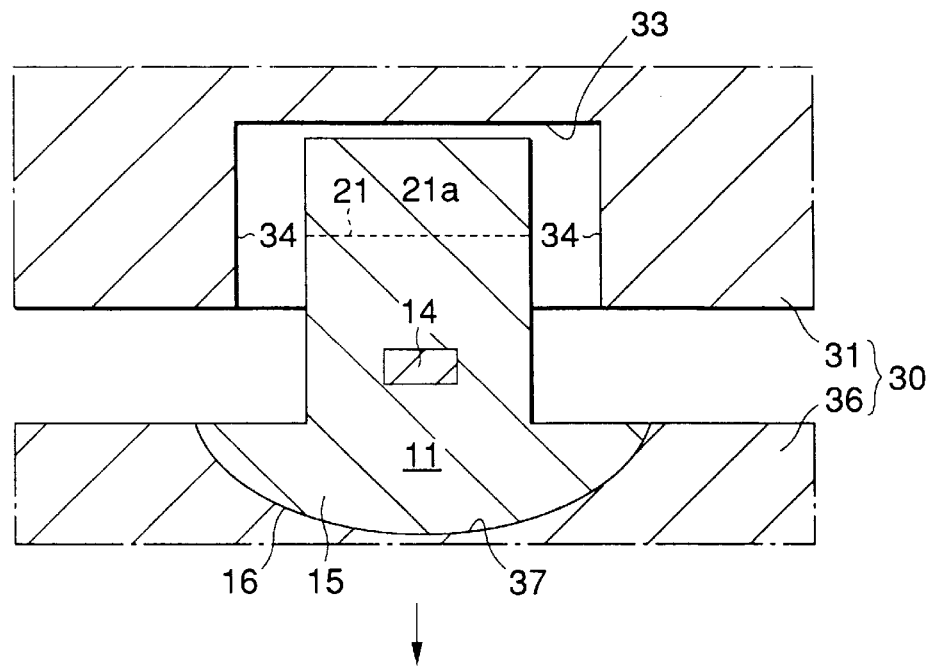
FIGS. 9A to 9C are section views of the molding blank member end portion, showing the stages of a pressing step employed in the second aspect of the invention.
Figure 9B:
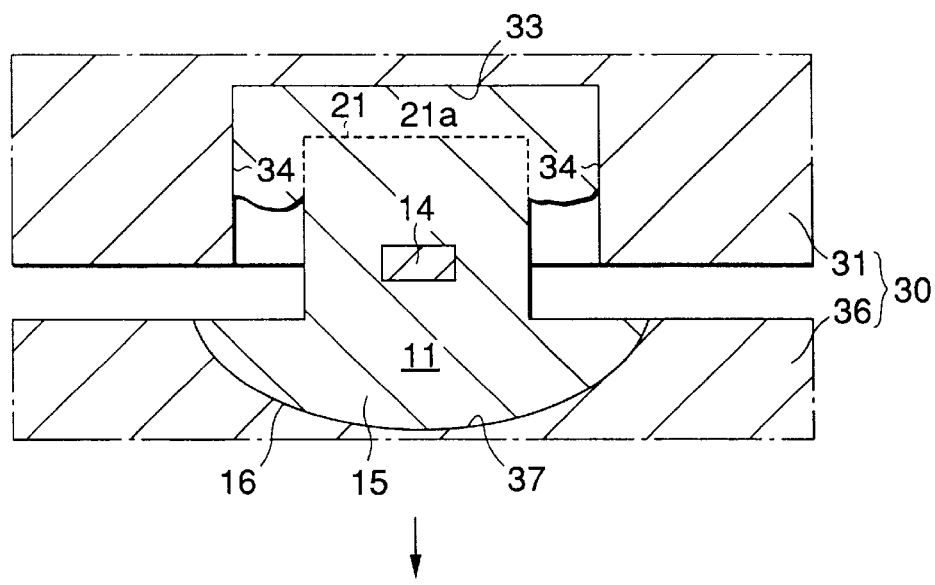
Figure 9C:
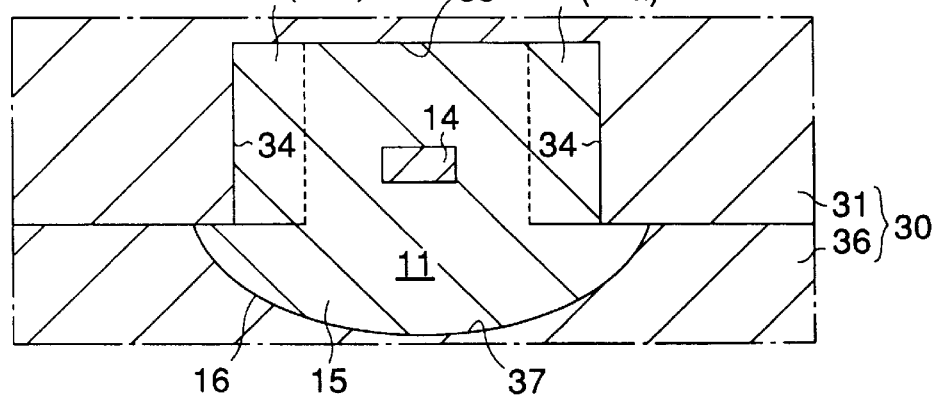

Now, FIG. 8 is a side view of the end portion 12 of a molding blank member 11 according to the second aspect of the invention, showing a state thereof in which the end portion 12 has been cut away in part. In the present embodiment, on the surface (lower end) of the cut-away portion 21 of the leg portion 13 on the back surface side of the end portion 12, there has been previously formed a bulged portion 21a, which is bulged from the cut-away portion 21 surface by a required amount. In particular, the bulged portion 21a is a portion which is located at a given position on the surface of the cut-away portion 21 and also in which a larger amount of resin is left than in the remaining portions thereof. And, similarly to the previously described embodiment according to the first aspect of the invention, after completion of the heating and softening operation, as shown in FIGS. 9A to 9C, the end portion of the molding blank member 11 is worked by pressing the same using the press molding mold 30. In this working, as shown in FIG. 9A, the bulged portion 21a of the cut-away portion 21 is pressed by the pressing projecting portion 33 of the pressing mold 31 and thus, as shown in FIGS. 9B and 9C, the resin of the bulged portion 21a is moved in the width direction thereof and is caused to flow into the projection-forming recessed groove 34 of the pressing mold 31, thereby forming the mounting and fixing projection portion 22 which projects in the width direction of the roof molding 10. The bulged portion 21a can be formed simply in such a manner that, when cutting away the resin of the back surface of the end portion 12 of the molding blank member 11, the resin at a given position on the end portion 12 back side is cut away by a smaller amount than in the remaining portions thereof in accordance with the shape of the bulged portion 21a to be formed. Also, when forming the bulged portion 21a, the pressing projecting portion 33 of the pressing mold 31 is not always necessary.

By the way, in the thus formed mounting and fixing projection portion 22 which projects in the width direction of the end portion 12 of the roof molding 10, there is a possibility that there can be produced collapses (sink marks) in the design surface 16. The reason for such phenomenon is assumed in the following manner: that is, since the mounting and fixing projection portion 22 is formed integrally with the back surface of the decorative portion 15, the portion of the decorative portion 15 with the mounting and fixing projection portion 22 is greatly different in the resin thickness and volume from the remaining portions thereof except the mounting and fixing projection portion 22, with the result that the heat holding amounts of the two different portions of the decorative portion 15 are different in the above-mentioned heating and softening operation and the shrinkage ratios of the two different portions are thereby caused to differ greatly after the heating and softening operation.

Figure 10:
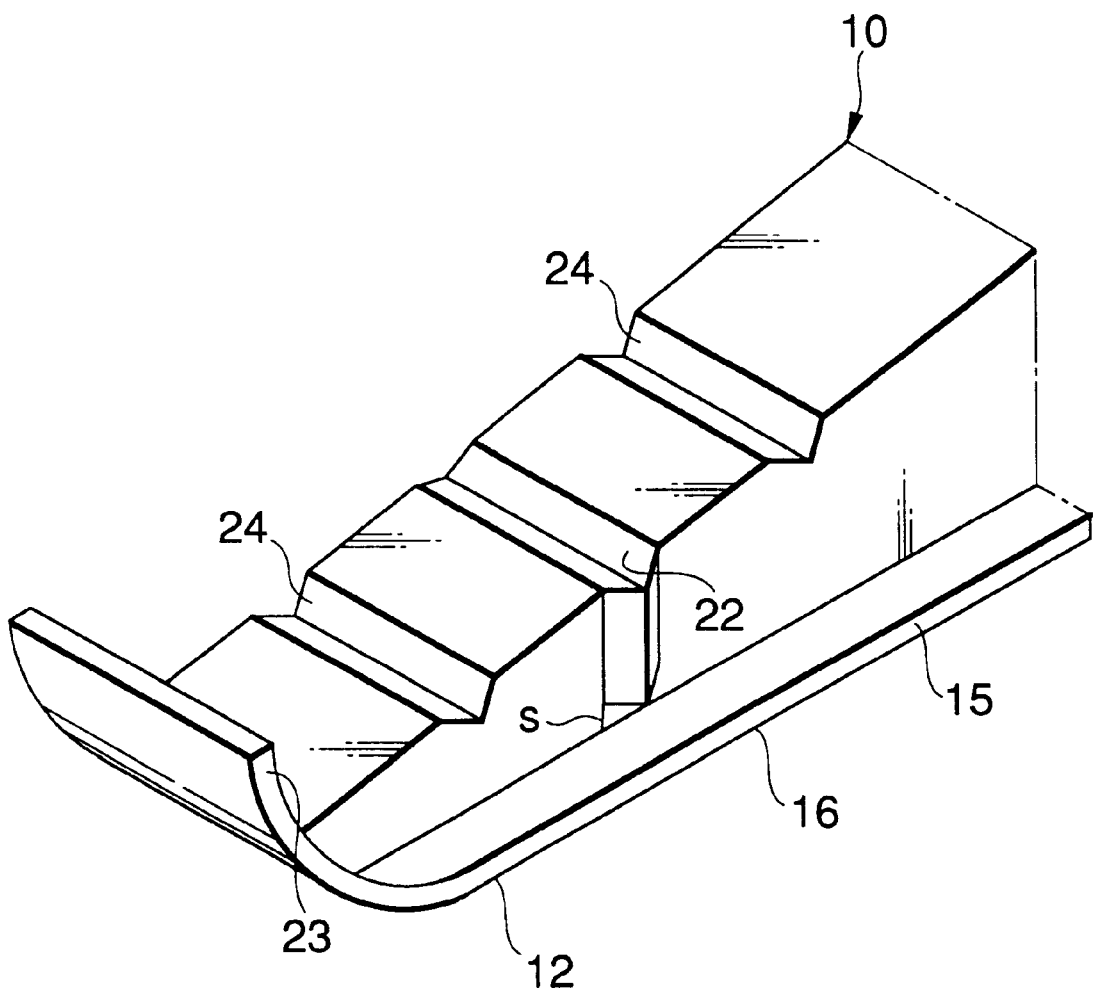
FIG. 10 is a perspective view of the main portions of a first embodiment of a roof molding for use in an automobile obtained according to a third aspect of the invention.

In view of this, preferably, as shown in FIG. 10, the roof molding 10 may be formed in such a manner that there is interposed a gap s between the mounting and fixing projection portion 22 and the back surface of the design surface 16, that is, the back surface of the decorative portion 15. With use of the roof molding 10 including such gap s, not only it is possible to avoid the above-mentioned appearance inconvenience produced in the design surface 16, but also, when a securing pawl (clip) is provided in the groove 54 of the roof 51, the gap s can also be used as a securing portion for the present securing pawl.

Figure 11:
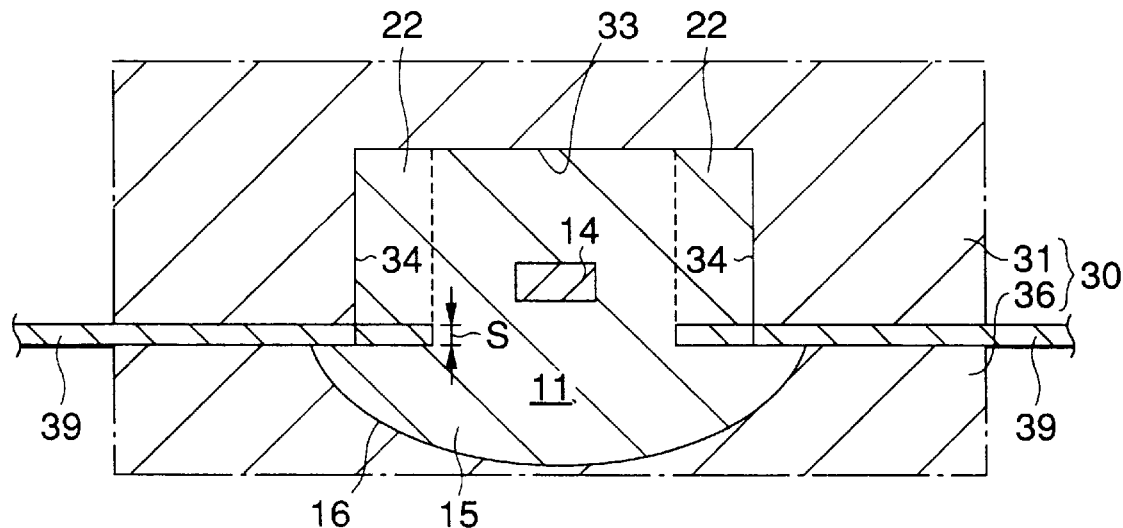
FIG. 11 is a section view of the roof molding shown in FIG. 10, showing a pressing step employed in a third aspect of the invention.

Now, the above-mentioned gap s can be obtained according to the third aspect of the invention. In particular, as shown in FIG. 11 which is a section view of a first embodiment according to the third aspect of the invention, a slide mold 39 having a height equal to the gap s has been previously disposed within the receiver mold 36 in such a manner that it can be freely slid in the horizontal direction and, in the pressing step to be carried out by the pressing mold 31, if the slide mold 39 is inserted into the back side of the decorative portion 15 of the end portion 12 of the molding blank member 11 and is then molded by pressing, then the gap s can be formed simply.

Figure 12:
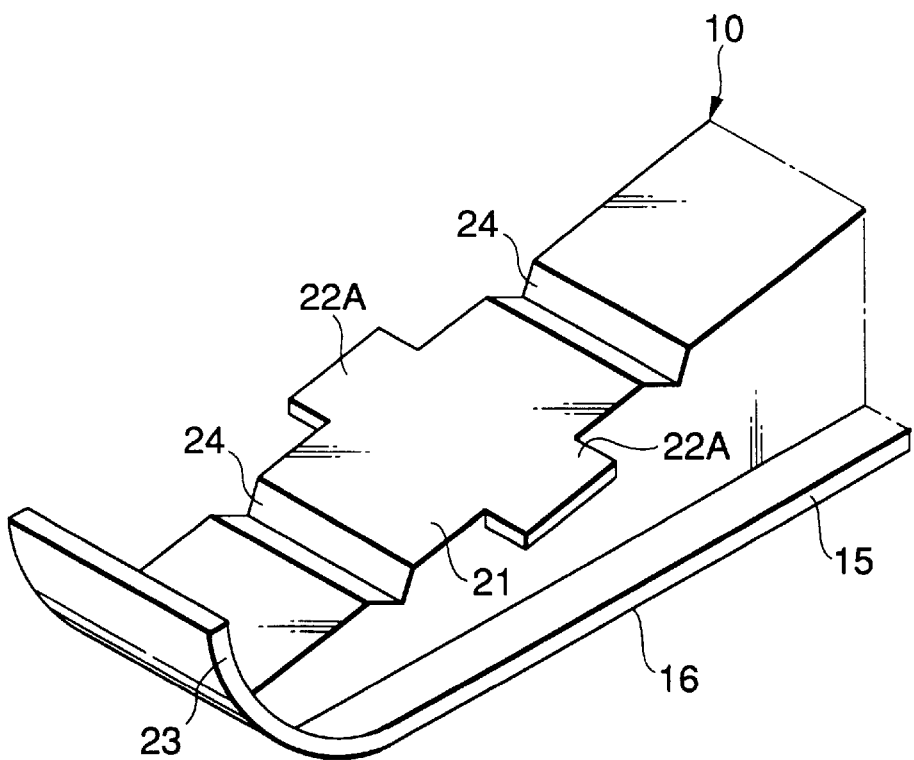
FIG. 12 is a perspective view of a second embodiment of a roof molding for use in an automobile obtained according to the aspect of the invention.

By the way, the end portion 12 of the roof molding 10 having the above-mentioned gap, alternatively, may also be formed as an end portion including such a projection portion 22A as shown in FIG. 12 which is wide in the longitudinal direction thereof. With use of such projection portion 22A, if the projection portion 22A as it is can be contacted with the inner wall of the groove 54 of the roof 51, then the end portion 12 can be fixed to the groove 54 of the roof 51; and, at the same time, a clip corresponding to the projection portion 22A may be provided in the groove 54 and, if the projection portion 22A may be secured to the clip, then the end portion 12 can be fixed to the groove 54 of the roof 51. By the way, in FIGS. 11 and 12, the same reference characters as in the previously described embodiment designate the same components thereof.

Figure 13:
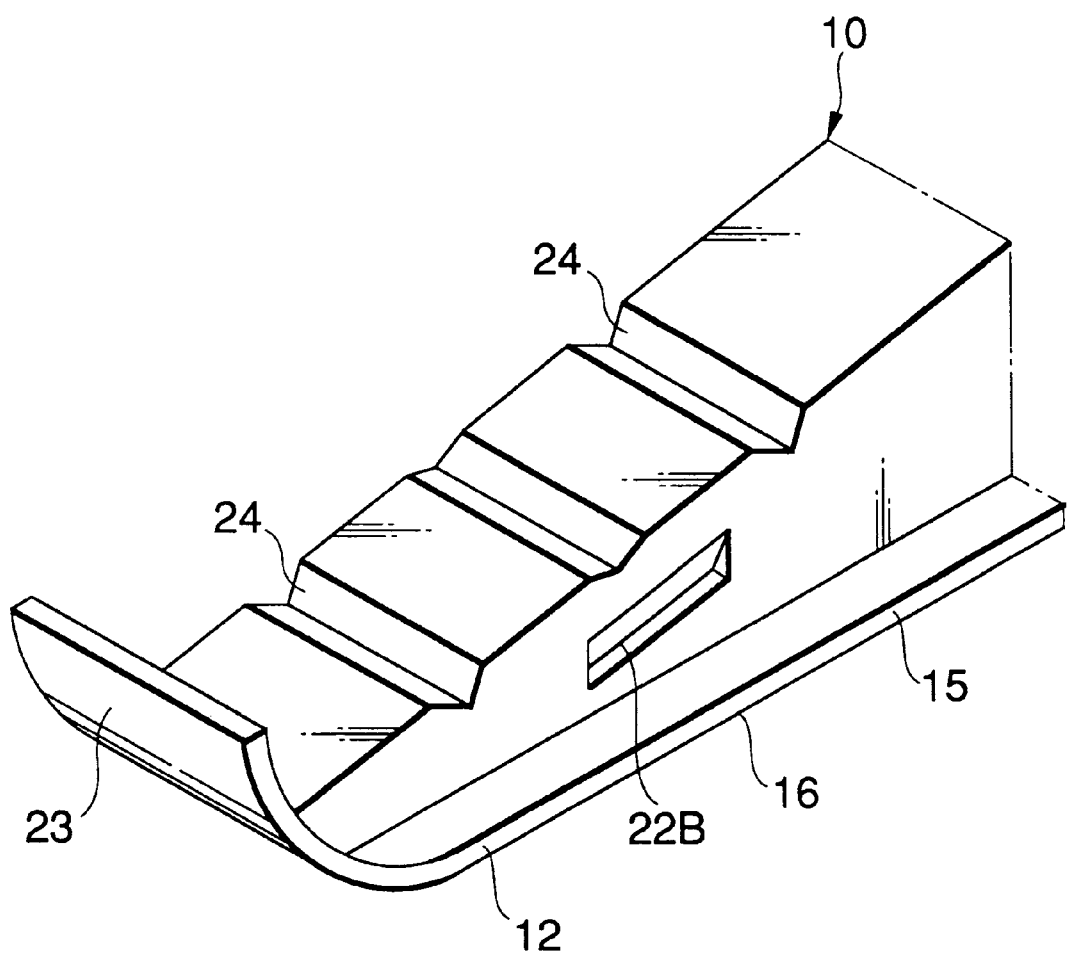
FIG. 13 is a perspective view of the main portions of an embodiment of a roof molding for use in an automobile obtained according to a fourth aspect of the invention.
Figure 14:
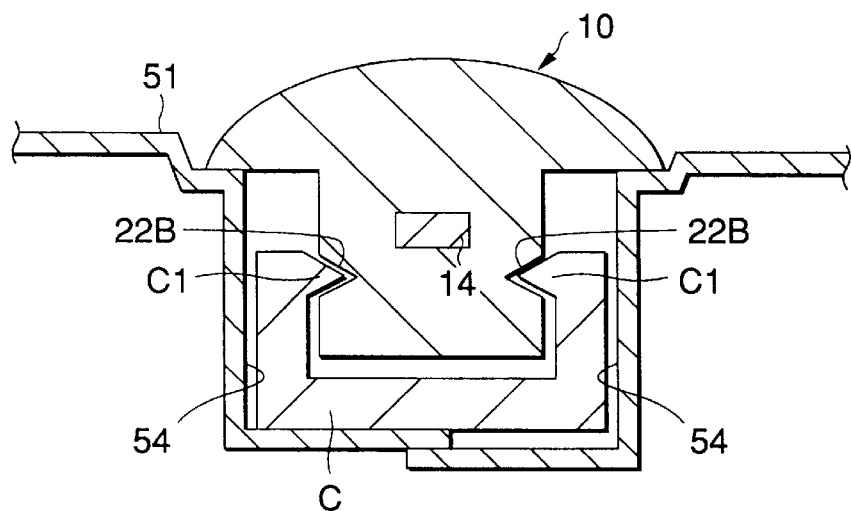
FIG. 14 is a section view of the roof molding shown in FIG. 13, showing a state thereof when it is in used.

Also, FIG. 13 is a perspective view of an embodiment of the end portion 12 of the roof molding 10 obtained according to the fourth aspect of the invention. In the end portion 12 of the present roof molding 10, on the side surface of the cut-away portion 21 thereof, there is formed a mounting and fixing recessed portion 22B. In particular, as shown in FIG. 14, if pawls C1 included in a clip C provided in the groove 54 of the roof 51 are secured to the mounting and fixing recessed portion 22B, then the end portion 12 of the roof molding 10 can be positively fixed to the groove 54 of the roof 51.

Figure 15:
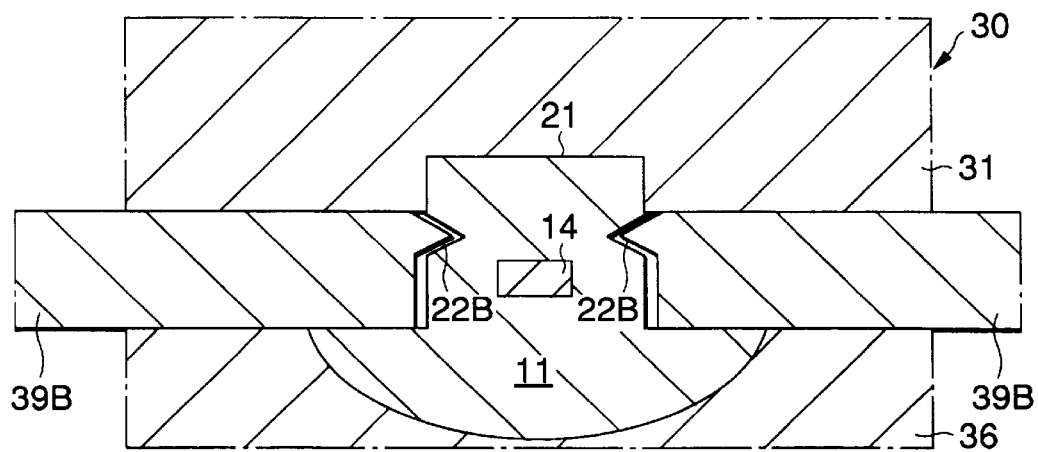
FIG. 15 is a section view of the roof molding shown in FIG. 13, showing a pressing step employed in the fourth aspect of the invention.

To form the above-mentioned mounting and fixing recessed portion 22B, as shown in FIG. 15, in the press working operation after the heating and softening treatment, the side surface of the cut-away portion 21 of the end portion 12 may be pressed by a horizontally slidable slide-type pressing mold 39B which is provided in the press molding mold 30.

As has been illustrated and described heretofore, according to a method for working the end portion of a roof molding according to the first to third aspects of the invention the back surface side of the end portion of a molding blank member consisting of an extruded molding is cut away, the thus cut end portion is heated and softened and, after then, the end portion is pressed and deformed by press working, thereby forming a mounting and fixing projection portion which projects at least on one side in the width direction of the end portion. Therefore, differently from the conventional method in which the end portion of the roof molding is injection molded, according to the invention, no joint line is produced between the end portion of the roof molding and the main body portion of the roof molding, which not only improves the appearance of the roof molding but also can eliminate the fear that the roof molding can be separated in the joint line. Also, since the mounting and fixing projection portion is formed in the end portion by pressing in such a manner as to be integral with the end portion, the mounting and fixing projection portion can provide a high strength; that is, when the end portion of the roof molding is fitted and mounted into the groove end portion of the automobile roof, the roof molding end portion can be mounted and fixed there positively, thereby preventing the roof molding end portion from warping without fitting from the groove of the automobile roof, so that the appearance of the automobile roof can be improved.

Further, as in the second aspect of the invention, because a bulged portion is formed on the cut-away portion of the back surface of the end portion of the molding blank material and the bulged portion is pressed by the pressing mold in the above-mentioned pressing operation, when the mounting and fixing projection portion is formed, the mounting and fixing projection portion can be formed easily and with a sufficient height. This makes it possible to obtain a roof molding end portion which can be fixed to the end portion of the groove of the roof more positively.

Still further, as in the third aspect of the invention, if the mounting and fixing projection portion is formed in such a manner that it can provide a gap with respect to the back side of the design surface of the roof molding, then there can be avoided inconveniences such as the sink marks of the design surface which could be caused due to the shrinkage ratio difference between the decorative portion and end portion of the roof molding after molded, thereby being able to obtain a molding end portion which can provide a very beautiful appearance.

Yet further, according to the fourth aspect of the invention, in the pressing step after completion of the heating and softening treatment, the side surface of the molding blank member is pressed by the pressing mold to thereby form the mounting and fixing recessed portion; and, the mounting and fixing recessed portion can be secured to the pawl(s) of a clip or a similar securing member provided in the groove of the roof. This makes it possible to obtain simply a roof molding end portion which can be positively fixed to the end portion of the groove of the roof.

What is claimed is:

1. A method for forming a roof molding from a molding blank member formed of resin and comprising a decorative top portion and a leg portion extending from a back surface of said decorative top portion, said method comprising the steps of:

removing a portion of said leg portion to form a cut-away portion of said leg portion at an end portion of said molding blank member and to reduce a cross-sectional thickness of said end portion of said molding blank member, wherein a lower end portion of said cut-away portion is inclined toward said back surface of said decorative top portion;

heating said end portion of said molding blank member to soften said cut-away portion of said leg portion of said molding blank member; and form pressing side surface of said softened cut-away portion of said leg portion via a pressing mold to form a mounting and fixing recessed portion on said side surface of said cut-away portion of said leg portion.

2. The method for forming a roof molding as set forth in claim 1, wherein said step of form pressing a side surface of said cut-away portion further comprises form pressing a bottom surface of said cut-away portion to form a bent groove in said cut-away portion.

3. A method for forming a roof molding from a molding blank member formed of resin and comprising a decorative top portion and a leg portion and extending from a back surface of said decorative top portion, the method comprising the steps of:

removing a portion of said leg portion to form a cut-away portion of said leg portion at an end portion of said molding blank member and to reduce a cross-sectional thickness of said end portion of said molding blank member, wherein a lower end portion of said cut-away portion is inclined toward said back surface of said decorative top portion and said cut-away portion includes a bulged portion which projects outwardly from a bottom surface of said cut-away portion;

heating said end portion of said molding blank member to soften said bulged portion of said cut-away portion of said molding blank member; and form pressing said softened bulged portion of said cut-away portion to move the resin of said bulged portion toward one side of said cut-away portion of said leg portion to form a mounting and fixing projection portion which projects outwardly on at least one side surface of said cut-away portion of said leg portion.

4. A method for forming a roof molding as set forth in claim 3, wherein said mounting and fixing projection portion has a gap with respect to the back surface of said decorative top portion.

5. The method for forming a roof molding as set forth in claim 3, wherein said step of form pressing said cut-away portion further comprises forming a bent groove in said cut-away portion of said leg portion.

6. A method for forming a roof molding from a molding blank member formed of resin and comprising a decorative top portion and a leg portion extending from a back surface of said decorative top portion, the method comprising the steps of:

removing a portion of said leg portion to form a cut-away portion of said leg portion at an end portion of said molding blank member and to reduce a cross-sectional thickness of said end portion of said molding blank member, wherein a lower end portion of said cut-away portion is inclined toward said back surface of said decorative top portion;

heating said end portion of said molding blank member to soften said cut-away portion of said leg portion of said molding blank member;

providing a pressing mold comprising a molding surface and side wall surfaces, wherein a pressing projecting portion extends along a width direction of said molding surface and a recessed projection-forming groove extends vertically along one of said sidewall surfaces; and form pressing said softened cut-away portion of said leg portion formed at said end portion using said pressing mold to form a mounting and fixing projection portion corresponding to said pressing projection portion and said projection-forming groove, said mounting and fixing projection portion projecting outwardly on at least one side surface of said cut-away portion of said leg portion at said end portion.

7. A method for forming a roof molding as set forth in claim 6, wherein said mounting and fixing projection portion has a gap with respect to the back surface of said decorative top portion.

8. The method for forming a roof molding as set forth in claim 6, wherein a bent-groove pressing projection portion is formed on the molding surface of said pressing mold and said step of form pressing said cut-away portion further comprises forming a bent grove in said cut-away portion of said leg portion corresponding to said bent-groove pressing projection portion.

* * * * *